3,222,385
TETRACYANOETHYLENIDE SALTS
Samuel I. Weissman, St. Louis, Mo., assignor to E. I. du Pont de Nemours and Company, Wilmington, Del., a corporation of Delaware
No Drawing. Filed July 25, 1962, Ser. No. 212,468
15 Claims. (Cl. 260—429)

This application is a continuation-in-part of my copending application Serial No. 12,975, filed March 7, 1960, and now abandoned.

This invention is concerned with a new class of salts in which the anion is organic in structure and composed entirely of carbon and nitrogen, and a process for the preparation of these salts.

Tetracyanoethylene is highly reactive toward many organic compounds in forming derivatives with covalent bond structures. Tetracyanoethylene is also recognized as a Lewis acid or Pi acid capable of forming complexes with aromatic hydrocarbons in which the attachment between the two molecules involves a partial charge transfer, as shown in "Organic Chemistry" by D. J. Cram and G. S. Hammond, McGraw-Hill, 1959, pages 181–182.

It is an object of this invention to provide a new class of salts in which the anion is organic in structure. It is a further object of this invention to provide an anion composed entirely of carbon and nitrogen and a process for its formation.

These and other objects of this invention are accomplished by providing the metal tetracyanoethylenides and a process for their preparation by the reaction of tetracyanoethylene with a metal in the essential absence of molecular oxygen.

In the metal tetracyanoethylenides, the tetracyanoethylene moiety is in the form of an ion radical $(C_6N_4 \cdot ^-)$ carrying a completely transferred electron. This ion radical has an ionic charge of $-1$ in the conventional sense. When compounds containing this ion are examined in dilute solution by the techniques for determining electron paramagnetic resonance, they show a characteristic 9-line spectrum in which the relative intensity ratios of the lines are 1:4:10:16:19:16:10:4:1 and the separation between lines is approximately 1.5 oersteds.

The metal tetracyanoethylenides of this invention may be expressed by the formula $M(C_6N_4)_x$ where M is a metal cation and $x$ is an integer. The value of $x$ is the same as the valence of M. The formula may thus alternatively be shown with the respective ionic charges in the form $M^+{}_x(C_6N_4^-)_x$ where M and $x$ are as defined above. M may be any metal, e.g., any element having an atomic number of 3, 4, 11–13, 19–32, 37–51, 55–84, 87–101 and above.

The metal tetracyanoethylenides are not stable in solution in the presence of molecular oxygen, being converted to the corresponding pentacyanopropenides with extreme rapidity. Once formed and isolated, they are stable for extended periods only in the absence of oxygen, being converted to the corresponding pentacyanopropenides during a few hours or after a few days of exposure to oxygen. The reactivity towards oxygen explains why the metal tetracyanoethylenides were not found in previous circumstances involving the simultaneous presence of tetracyanoethylene and a metal.

The reaction of tetracyanoethylene with a metal to form a metal tetracyanoethylenide will take place over a wide range of temperature. However, at excessively high temperatures metal tetracyanoethylenides are rapidly decomposed. Thus, temperatures above 250° C. are to be avoided and temperatures of 200° C. and below are preferred. At temperatures below 100° C. and particularly at room temperature and below, the reaction of tetracyanoethylene with a metal to form a metal tetracyanoethylenide is slow. Under these conditions it is preferable, although not absolutely essential, to carry out the reaction in the presence of a suitable reaction medium. Preferred reaction media include such ethers as tetrahydrofuran, dimethyl ether, ethylene glycol dimethyl ether, and the like. With metals other than the alkali metals, transition metals or alkaline earth metals, for example, media such as organic nitriles, i.e., acetonitrile and benzonitrile, esters, i.e., ethyl acetate, ketones, i.e., acetone, and amides, i.e., dimethylformamide, may be employed. When a reaction medium of this type is used, the reaction can be carried out at low temperatures, such as $-80°$ C. and below, although there is little advantage to using excessively low temperatures.

Pressure is not a critical factor in the practice of this invention and pressures both above and below atmospheric pressure may be employed. For example, the vapor phase reaction of tetracyanoethylene with a metal, such as an alkali metal or alkaline earth metal, may be carried out at atmospheric pressure as well as at substantially reduced pressures. The reaction may also be carried out using a volatile ether as the reaction medium at atmospheric pressure or in a closed vessel at superatmospheric pressure in order to employ an elevated temperature.

The metathetical reactions by which other metal tetracyanoethylenides may be prepared from the alkali and alkaline earth metal tetracyanoethylenides are conveniently carried out in water in which the alkali and alkaline earth metal tetracyanoethylenides are soluble. This is illustrated in the preparation of the silver salt from the sodium salt in Example XVII. A particularly useful reactant for this metathetical procedure is barium tetracyanoethylenide. When an aqueous solution of this compound is treated with an aqueous solution of the sulfate of any other metal, barium sulfate is precipitated quantitatively, leaving an aqueous solution from which the corresponding metal tetracyanoethylenide is recovered by removal of water.

Metal tetracyanoethylenides may also be prepared by the reaction of tetracyanoethylene with metal salts having nucleophilic anions capable of reducing tetracyanoethylene. Those anions having redox potentials of greater negative value than that of the tetracyanoethylene-tetracyanoethylenide couple will transfer an electron to tetracyanoethylene forming the tetracyanoethylenide. Iodides, cyanides, sulfides and mercaptides are particularly useful nucleophilic anions. This process is illustrated by the reaction of potassium iodide with tetracyanoethylene to yield potassium tetracyanoethylenide as shown in Example XIV. To obtain substantial yields of tetracyanoethylenides from the reaction of tetracyanoethylene with metal cyanides, the mole equivalent ratio of tetracyanoethylene to metal cyanide in the reacting system must be less than 1.01.

At a dropping mercury electrode in acetonitrile containing 0.1 M $LiClO_4$, the reaction [tetracyanoethylene+$e \leftrightarrow$ tetracyanoethylenide] is reversible and has a half-wave potential of approximately $+0.15$ volt vs. the aqueous saturated calomel electrode. Redox couples [oxidized species+$e \leftrightarrow$ reduced species] having an electrode potential more negative than this value for tetracyanoethylene in this system are capable of reducing tetracyanoethylene to tetracyanoethylenide. Audrieth and Kleinberg, "Non-aqueous Solvents," John Wiley and Sons, New York, New York, 1953, page 141, list a series of potentials for materials in acetonitrile solvent. Latimer, "Oxidation Potentials," Prentice-Hall, Inc., New York, New York, 1952, lists on pages 340–348 a series of oxidation-reduction potentials for inorganic reagents in an aqueous system. By applying suitable corrections for conversion to the system of 0.1 M LiClO₄ in acetonitrile vs. the aqueous saturated calomel electrode, one skilled in the art can determine which oxidation-reduction couples in these lists are capable of converting tetracyanoethylene to tetracyanoethylenide.

In the following examples parts are by weight unless otherwise specified.

*Example I*

Elemental potassium and vaporized tetracyanoethylene in the absence of oxygen react spontaneously in a glass reactor to yield potassium tetracyanoethylenide (KC₆N₄) which condenses on the reactor as a purple solid.

*Example II*

In a glass reactor tetracyanoethylene is dissolved in tetrahydrofuran (previously dried over Na-K alloy) in the absence of oxygen to yield a 0.01 M solution. This solution is brought into contact with a previously distilled mirror of potassium metal in another part of the reactor. The potassium is absorbed almost immediately to yield a bright yellow solution of potassium tetracyanoethylenide. The paramagnetic nature of potassium tetracyanoethylenide in this solution is characterized by its electron spin resonance. When a portion of this solution is exposed to the oxygen of air, the characteristic electron spin resonance disappears almost immediately. From the remainder of the unexposed solution, tetrahydrofuran is removed by evaporation under vacuum at room temperature, yielding potassium tetracyanoethylenide as a purple solid.

*Example III*

The process of Example II is repeated with the single exception that a mirror of sodium metal is used in place of potassium. A bright yellow solution of sodium tetracyanoethylenide in tetrahydrofuran is obtained. On evaporation this yields sodium tetracyanoethylenide, (NaC₆N₄), as a purple solid.

*Example IV*

The process of Example II is repeated with the single exception that 1,2-dimethoxyethane is used in place of tetrahydrofuran as the solvent. Potassium tetracyanoethylenide is obtained.

*Example V*

To a solution of tetracyanoethylene in acetonitrile blanketed with nitrogen is added powdered zinc metal. As the zinc dissolves, the solution turns from colorless to yellow, and zinc tetracyanoethylenide [Zn(C₆N₄)₂] forms as a yellow precipitate which is separated by filtration. The yellow solution shows the fine structure absorption spectrum around 420 millimicrons characteristic of the tetracyanoethylene ion radical. Both the solid zinc tetracyanoethylenide and its solutions in acetonitrile are strongly paramagnetic.

*Example VI*

An excess of copper in the form of turnings is placed in a solution of 40 parts of tetracyanoethylene in about 117 parts of acetonitrile in a system blanketed with nitrogen. A black coating deposits on the copper and the solution becomes yellow. The copper with the black coating is removed from the solution and washed with two portions of fresh acetonitrile. This washing dissolves the black coating to yield a yellow solution. The yellow solution is added to 2,198 parts of benzene, causing cuprous tetracyanoethylenide (CuC₆N₄) to precipitate in the form of a black powder. Cuprous tetracyanoethylenide is strongly paramagnetic and has the characteristic many-line absorption spectrum characteristic of the tetracyanoethylene ion radical in the 470–380 millimicrons region.

*Analysis.*—Calcd. for CuC₆N₄: Cu 33.17%. Found: Cu, 33.14%.

*Example VII*

To a solution of 85 parts of BaI₂·2H₂O in 396 parts of acetone is added a solution of 200 parts of tetracyanoethylene in 1,566 parts of acetonitrile in a system blanketed with nitrogen. After 20 minutes at room temperature, the mixture is poured into 21,985 parts of benzene. Barium tetracyanoethylenide [Ba(C₆N₄)₂] is precipitated as a blue powder, separated by filtration, washed with benzene, and dried under nitrogen. The infra-red absorption spectrum of this solid shows bands at 4.50, 4.55, 6.2, and 7.3 microns. An acetonitrile solution of barium tetracyanoethylenide is yellow and has the characteristic closely spaced absorption spectrum showing peaks at 466, 457, 446, 435, 424, 415, 406, 398, 390, and 382 millimicrons.

If acetonitrile is used in place of acetone, sodium ethyl mercaptide, sodium phenyl mercaptide or sodium sulfide may be used in place of BaI₂·2H₂O to form the tetracyanoethylenide having the sodium cation, according to the above process.

*Example VIII*

Powdered manganese metal (100 parts) is added to a solution of 100 parts of tetracyanoethylene in 783 parts of acetonitrile at room temperature. A nitrogen atmosphere is used to exclude oxygen. The solution slowly becomes yellow with the formation of manganese tetracyanoethylenide [Mn(C₆N₄)₂]. The solution shows the fine structure absorption characteristic of tetracyanoethylene ion radical in the short wave length region of the visible spectrum. The reaction of manganese with tetracyanoethylene can be catalyzed by the addition of a trace of iodine.

*Example IX*

To a solution of 400 parts of tetracyanoethylene in 2,348 parts of acetonitrile in a glass reactor swept with nitrogen is added 300 parts of powdered aluminum metal. The solution slowly turns yellow at room temperature with the formation of aluminum tetracyanoethylenide [Al(C₆N₄)₃]. The visible absorption spectrum of this solution between 466 and 396 millimicrons shows the many maxima characteristic of the tetracyanoethylene ion radical.

*Example X*

A glass reactor containing 128 parts of tetracyanoethylene is evacuated and 290 parts of gaseous Ni(CO)₄ is introduced. Nickelous tetracyanoethylenide [Ni(C₆N₄)₂] forms as a black solid at room temperature. A corresponding equivalent amount of carbon monoxide is recovered. Nickelous tetracyanoethylenide dissolves in acetonitrile to yield a yellow solution which shows absorption maxima at 458, 442, 435, 425, 416, 406, 398, and 390 millimicrons.

*Example XI*

To a suspension of 55 parts of sodium cyanide in 3,914 parts of carefully dried acetonitrile in a system blanketed with nitrogen is added a solution of 145 parts of tetracyanoethylene in 7,045 parts of acetonitrile. The mole ratio of tetracyanoethylene to sodium cyanide is 1.0089. Within a few minutes the solution turns dark purplish-brown in color and after 15 minutes is poured into 3,568 parts of diethyl ether. Sodium tetracyanoethylenide precipitates as a brown solid and is collected by filtration. The identity of the product is confirmed by its characteristic 9-line electron paramagnetic resonance spectrum. The yield is 75 parts (44%).

*Analysis.*—Calcd. for NaC₆N₄: C, 47.8%; H, 0.000%; N, 37.2%. Found: C, 46.75%; H, 0.68%; N, 36.45%.

*Example XII*

A solution of 4,870 parts of tetracyanoethylene in 39,140 parts of acetonitrile is cooled to −40° C. under nitrogen and 2,534 parts of potassium cyanide is added. The mole ratio of tetracyanoethylene to potassium cyanide is 0.977. The reaction mixture is stirred for four hours at −40° C. and filtered while cold. The cold filtrate is allowed to warm to room temperature, and after three hours, 3,330 parts of potassium tetracyanoethylenide is collected by filtration. Evaporation of the filtrate yields an additional 1,340 parts of potassium tetracyanoethylenide. The over-all yield is 73%.

*Example XIII*

To a suspension of 190 parts of potassium cyanide in 3,914 parts of acetonitrile, a solution of 25 parts of tetracyanoethylene in 3,914 parts of acetonitrile is added slowly under nitrogen with stirring over a period of five hours. The molar ratio of tetracyanoethylene to potassium cyanide is 0.0669. The temperature is maintained at 20–25° C. Spectral analysis of the product shows a quantitative yield of potassium tetracyanoethylenide.

*Example XIV*

A mixture of 300 parts of dry potassium iodide and 170 parts of tetracyanoethylene is placed in a glass reactor. The system is evacuated and then filled with nitrogen. About 3920 parts of acetonitrile is added and the resulting suspension is agitated for 4 hours at room temperature. Filtration yields 114 parts of potassium tetracyanoethylenide in the form of a bronze-colored crystalline solid. After recrystallization from acetonitrile, this product shows infrared and ultraviolet absorption spectra identical to those of the corresponding barium salt in Example VII.

*Analysis.*—Calcd. for $KC_6N_4$: C, 43.10%; N, 33.51%. Found: C, 43.21%, 43.17%; N, 33.50%, 33.36%.

*Example XV*

A mixture of 32.8 parts of tetracyanoethylene, 235 parts of acetonitrile and 50 parts of cesium iodide in a system blanketed with nitrogen is stirred for 4 hours at room temperature. Filtration under nitrogen yields 13 parts of cesium tetracyanoethylenide ($CsC_6N_4$) in the form of bronze-colored crystals. Its identity is confirmed by its characteristic infrared absorption spectrum.

*Example XVI*

To a suspension of 50 parts of tetracyanoethylene in 1427 parts of anhydrous diethyl ether in a system blanketed with nitrogen is added a solution of 45 parts of lithium iodide in 78 parts of acetonitrile. The reaction mixture is stirred for 2 hours at room temperature and then filtered under nitrogen. The precipitate is lithium tetracyanoethylenide ($LiC_6N_4$) which weighs 15 parts and is obtained as a purple crystalline solid. Its identity is confirmed by its characteristic infrared absorption spectrum.

*Example XVII*

A solution of 100 parts of sodium tetracyanoethylenide in about 2,000 parts of deoxygenated water is added to a solution of 100 parts of silver nitrate in 2,000 parts of deoxygenated water in a system blanketed with nitrogen. Silver tetracyanoethylenide [$Ag(C_6N_4)$] precipitates as a bright purple solid which is recovered by filtration and dried at room temperature under reduced pressure. The yield is 99 parts. The infrared absorption spectrum contains the characteristic bands of metal tetracyanoethylenides at 4.50, 4.55, 6.2 and 7.3 microns.

When chromic nitrate, ferrous nitrate, cadmium nitrate, stannous chloride, mercurous nitrate, or lead nitrate is substituted for silver nitrate in the process of Example XVII, chromic tetracyanoethylenide, ferrous tetracyanoethylenide, cadmium tetracyanoethylenide, stannous tetracyanoethylenide, mercurous tetracyanoethylenide, and lead tetracyanoethylenide, respectively, are obtained.

By suitable substitution of the corresponding salts of other metals in the processes of Examples VII, XI, XV, XVI or XVII, all the metal tetracyanoethylenides may be prepared.

The reactivity of the metal tetracyanoethylenides with oxygen makes them useful as a class as oxygen scavengers to remove oxygen from gases. Thus, any of these compounds may be used as the active ingredient in a scrubbing operation to remove oxygen from nitrogen, helium, and the like. This is illustrated as follows:

Nitrogen gas containing 1% of oxygen is passed by means of a fritted tube inlet through a 1.5% solution of sodium tetracyanoethylenide in acetonitrile. Analysis of the resulting gas shows that in a single pass the oxygen content is reduced to 0.4%.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Tetracyanoethylenide salt having the formula $$M(C_6N_4)_x$$

where M is a metal cation and $x$ is an integer equal to the valence of M.

2. Tetracyanoethylenide salt having the formula $$M(C_6N_4)_x$$

where M is an alkali metal cation and $x$ is an integer equal to the valence of M.

3. Tetracyanoethylenide salt having the formula $$M(C_6N_4)_x$$

where M is an alkaline earth metal cation and $x$ is an integer equal to the valence of M.

4. Tetracyanoethylenide salt having the formula $$M(C_6N_4)_x$$

where M is a transition metal cation and $x$ is an interger equal to the valence of M.

5. Potassium tetracyanoethylenide.
6. Sodium tetracyanoethylenide.
7. Barium tetracyanoethylenide.
8. Process for the preparation of a tetracyanoethylenide salt having the formula $$M(C_6N_4)_x$$

where M is a metal cation and $x$ is an integer equal to the valence of M, which comprises contacting and reacting tetracyanoethylene with a metal, in the substantial absence of oxygen and at a temperature not in excess of 250° C.

9. Process for the preparation of a tetracyanoethylenide salt having the formula $$M(C_6N_4)_x$$

where M is a metal cation and $x$ is an integer equal to the valence of M, which comprises contacting and reacting tetracyanoethylene with an unsubstituted metal carbonyl, in the substantial absence of oxygen and at a temperature not in excess of 250° C.

10. Process for the preparation of a tetracyanoethylenide salt having the formula $$M(C_6N_4)_x$$

where M is a metal cation and $x$ is an integer equal to the valence of M, which comprises contacting and reacting tetracyanoethylene with a metal, in the presence of a solvent inert to the reactants, in the substantial absence of oxygen and a a temperature not in excess of 250° C.

11. Process for the preparation of a tetracyanoethylenide salt having the formula $$M(C_6N_4)_x$$

where M is a metal cation and $x$ is an integer equal to the valence of M, which comprises contacting and reacting tetracyanoethylene with a metal salt having an anion which is a member of the group consisting of iodide, cyanide, sulfide, and mercaptide, in the presence of a solvent inert to the reactants, in the substantial absence of oxygen and at a temperature not in excess of 250° C.

12. Process for the preparation of a tetracyanoethylenide salt having the formula $$M(C_6N_4)_x$$

where M is a metal cation and $x$ is an integer equal to the valence of M, which comprises contacting and reacting at a temperature not in excess of 250° C. and in the substantial absence of oxygen, tetracyanoethylene with a metal cyanide, the mole equivalent ratio of tetracyanoethylene to metal cyanide in the reaction system being less than 1.01, said reaction being effected in the presence of a solvent inert to the reactants.

13. Process for the preparation of a tetracyanoethylenide salt having the formula $$M(C_6N_4)_x$$

where M is a metal cation and $x$ is an integer equal to the valence of M, which comprises contacting and reacting tetracyanoethylene with an alkali metal, in the substantial absence of oxygen and at a temperature not in excess of 250° C.

14. Process for the preparation of a tetracyanoethylenide salt having the formula $$M(C_6N_4)_x$$

where M is a metal cation and $x$ is an integer equal to the valence of M, which comprises contacting and reacting tetracyanoethylene with an alkaline earth metal, in the presence of a solvent inert to the reactants, in the substantial absence of oxygen and at a temperature not in excess of 250° C.

15. Process for the preparation of a tetracyanoethylenide salt having the formula $$M(C_6N_4)_x$$

where M is a metal cation and $x$ is an integer equal to the valence of M, which comprises contacting and reacting tetracyanoethylene with a transition metal, in the presence of a solvent inert to the reactants, in the substantial absence of oxygen and at a temperature not in excess of 250° C.

References Cited by the Examiner
UNITED STATES PATENTS
2,766,243    10/1956    Middleton _____ 260—270

TOBIAS E. LEVOW, *Primary Examiner.*
ABRAHAM H. WINKELSTEIN, *Examiner.*